(12) United States Patent
Vega (10) Patent No.: US 9,851,119 B2
(45) Date of Patent: Dec. 26, 2017

(54) HVAC WORKLOAD AND COST LOGIC

(71) Applicant: Vivint, Inc., Provo, UT (US)

(72) Inventor: JonPaul Vega, Highland, UT (US)

(73) Assignee: Vivint, Inc., Provo, UT (US)

( * ) Notice: Subject to any disclaimer, the term of this patent is extended or adjusted under 35 U.S.C. 154(b) by 418 days.

(21) Appl. No.: 14/543,354

(22) Filed: Nov. 17, 2014

(65) Prior Publication Data

US 2016/0138819 A1     May 19, 2016

(51) Int. Cl.
*F24F 11/00*     (2006.01)
*G06Q 30/02*     (2012.01)
*G06Q 50/06*     (2012.01)

(52) U.S. Cl.
CPC ........ *F24F 11/006* (2013.01); *G06Q 30/0283* (2013.01); *G06Q 50/06* (2013.01); *F24F 2011/0094* (2013.01)

(58) Field of Classification Search
CPC ............ F24F 11/006; F24F 2011/0094; G06Q 50/06; G06Q 30/0283
See application file for complete search history.

(56) References Cited

U.S. PATENT DOCUMENTS

| | | | |
|---|---|---|---|
| 7,886,985 B2 | 2/2011 | Moore et al. | |
| 7,992,630 B2 | 8/2011 | Springer et al. | |
| 8,751,186 B2 | 6/2014 | Steinberg et al. | |
| 8,788,448 B2 | 7/2014 | Fadell et al. | |
| 9,182,142 B2* | 11/2015 | Wen | F24F 11/0012 |
| 9,429,961 B2* | 8/2016 | Sprinkle | G05D 23/1917 |
| 2012/0203379 A1 | 8/2012 | Sloo et al. | |
| 2013/0179373 A1* | 7/2013 | Mutchnik | G06Q 30/0283 705/412 |
| 2014/0222219 A1* | 8/2014 | Wen | F24F 11/0012 700/278 |
| 2014/0277762 A1 | 9/2014 | Drew | |
| 2015/0127169 A1* | 5/2015 | Quam | F24F 11/0086 700/276 |
| 2015/0127172 A1* | 5/2015 | Quam | F24F 11/0086 700/276 |
| 2015/0127174 A1* | 5/2015 | Quam | F24F 11/0086 700/276 |
| 2015/0378373 A1* | 12/2015 | Sprinkle | G05D 23/1917 700/276 |

* cited by examiner

*Primary Examiner* — M Elamin
(74) *Attorney, Agent, or Firm* — Holland & Hart LLP (57) ABSTRACT

A method for HVAC workload and cost logic is described. In one embodiment, the method includes detecting a thermostat of an HVAC system being set to a target temperature and upon detecting the thermostat being set to the target temperature, detecting a current indoor condition and a current outdoor condition. In some embodiments, the method includes calculating an estimated runtime of an HVAC heating or cooling cycle for the target temperature. The estimated runtime is based on the target temperature, the current indoor and outdoor conditions, and on a result of querying a correlation database. The correlation database includes data points for a plurality of previous HVAC heating and cooling cycles.

19 Claims, 6 Drawing Sheets

Temperature Data — 300

| Target Temp | Indoor Conditions | Outdoor Conditions | Indoor Differential | Cycle Runtime | Cost |
|---|---|---|---|---|---|
| 72 F | Temp: 74 F Humidity: 30% | Temp: 80 F Humidity: 35% | +2 F | 15 min | $1.10 |
| 70 F | Temp: 72 F Humidity: 35% | Temp: 65 F Humidity: 45% | +2 F | 10 min | $0.88 |
| 68 F | Temp: 66 F Humidity: 40% | Temp: 60 F Humidity: 55% | -2 F | 7 min | $0.67 |
| 68 F | Temp: 65 F Humidity: 45% | Temp: 50 F Humidity: 65% | -3 F | 15 min | $0.75 |
| ... | ... | ... | ... | ... | ... |
| 72 F | Temp: 75 F Humidity: 25% | Temp: 90 F Humidity: 30% | +3 F | 20 min | $1.35 |

305 — (Indoor Conditions column)
310 — (Target Temp column)
315 — (first data row)

HVAC WORKLOAD AND COST LOGIC

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The widespread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in building and residential automation, and building and residential indoor climate control systems. For example, advancements in mobile devices allow users to monitor and/or adjust the indoor climate of a home or business from anywhere in the world. Nevertheless, benefits may be realized by providing systems and methods for improving automation and indoor climate control systems.

SUMMARY

According to at least one embodiment, a method for heating ventilation air conditioning (HVAC) workload and cost logic is described. In one embodiment, the method may include detecting a thermostat of an HVAC system being set to a target temperature and upon detecting the thermostat being set to the target temperature, detecting a current indoor condition and a current outdoor condition. The current indoor condition may include at least one of a current indoor temperature and a current indoor humidity. The current outdoor condition may include at least one of a current outdoor temperature and a current outdoor humidity. In some embodiments, the method may include calculating an estimated runtime of an HVAC heating or cooling cycle for the target temperature. The estimated runtime may be based on the target temperature, the current indoor and outdoor conditions, and/or on a result of querying a correlation database. The correlation database may include data points for a plurality of previous HVAC heating and cooling cycles.

In some embodiments, the method may include calculating a cost of the estimated runtime by querying an energy rate database. The cost of the estimated runtime may be based on an identified energy rating of the HVAC system. The data points of each of the plurality of previous HVAC heating and cooling cycles may include a correlation between a monitored indoor condition, a monitored outdoor condition, a calculated indoor temperature difference, a calculated outdoor temperature difference, an HVAC cycle runtime, and/or a cost associated with one of the plurality of previous HVAC heating and cooling cycles. The indoor/outdoor temperature differences may include a difference between an indoor/outdoor temperature and a target temperature at the time one of the plurality of previous HVAC heating and cooling cycles is initiated.

In one embodiment, the method may include calculating a suggested temperature setting based on calculating the estimated runtime and calculating a cost for each of the one or more suggested target temperatures. The suggested temperature setting may include one or more suggested target temperatures. In some cases, the method may include generating a notification. The notification may include one or more of an elapsed runtime of a current HVAC cycle, a cost accumulated so far in the current HVAC cycle, an estimated remaining cost associated with the current HVAC cycle, an estimated total cost if no changes are made with the current HVAC cycle, one or more suggested target temperatures, and the cost of the one or more suggested target temperatures.

In one embodiment, the method may include identifying a closest match between the current indoor and outdoor conditions and an entry in the correlation database and comparing a recorded runtime in the closest matching entry in the correlation database with a current runtime. Upon determining the current runtime exceeds the recorded runtime, the method may include generating a notification indicating a potential fault existing in the HVAC system. In some embodiments, the method may include suggesting a modification to the target temperature if an accumulated runtime of a current cycle satisfies a runtime threshold, an accumulated cost of a current cycle satisfies a cost threshold, or an estimated remaining runtime to get to the target temperature satisfies an estimated runtime threshold. In some cases, the method may include suggesting a modification to the target temperature if an estimated remaining cost to get to the target temperature satisfies an estimated cost threshold. In some embodiments, upon determining the data points of the correlation database satisfy a predetermined threshold, enabling the HVAC analysis described herein.

A computing device configured for HVAC workload and cost logic is also described. The computing device may include a processor and memory in electronic communication with the processor. The memory may store computer executable instructions that when executed by the processor cause the processor to perform the steps of detecting a thermostat of an HVAC system being set to a target temperature and upon detecting the thermostat being set to the target temperature, detecting a current indoor condition and a current outdoor condition. In some embodiments, the memory may store computer executable instructions that when executed by the processor cause the processor to perform the step of calculating an estimated runtime of an HVAC heating or cooling cycle for the target temperature. The estimated runtime may be based on the target temperature, the current indoor and outdoor conditions, and/or on a result of querying a correlation database. The correlation database may include data points for multiple previous HVAC heating and cooling cycles.

A non-transitory computer-readable storage medium storing computer executable instructions is also described. When the instructions are executed by a processor, the execution of the instructions may cause the processor to perform the steps of detecting a thermostat of an HVAC system being set to a target temperature and upon detecting the thermostat being set to the target temperature, detecting a current indoor condition and a current outdoor condition. In some embodiments, the memory may store computer executable instructions that when executed by the processor cause the processor to perform the step of calculating an estimated runtime of an HVAC heating or cooling cycle for the target temperature. The estimated runtime may be based on the target temperature, the current indoor and outdoor conditions, and/or on a result of querying a correlation database. The correlation database may include data points for multiple previous HVAC heating and cooling cycles The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to heating ventilation air conditioning (HVAC) systems. More specifically, the systems and methods described herein relate to HVAC workload and cost logic in relation to current thermostat settings and indoor/outdoor conditions. Some embodiments of the systems and methods described herein relate to HVAC workload and cost logic in relation to an integration of building or residential automation and a messaging service.

The present systems and methods described herein generally relate to improving climate control in a premises environment. The typical HVAC system is composed of a single thermostat located in a central location. This single thermostat controls the heating and cooling of an entire home. Different areas of the home, however, experience varying amounts of heating and cooling due to outdoor weather conditions. A south-facing, unshaded room in the summer may experience a higher room temperature than a south-facing room of the same home that is shaded by a large tree. Likewise, a south-facing room is likely to be warmer due to outdoor conditions than a north-facing room, and a top-level room is likely to be warmer than a lower-level room. Nevertheless, the heating and cooling of a typical home or office is controlled by a central thermostat, resulting in wasted costs as some rooms are served adequately and others are served inadequately. Moreover, the heating and cooling is controlled by a single input, that of an occupant adjusting a temperature setting on a thermostat. Accordingly, the systems and methods described herein improve the typical HVAC system to address such concerns.

In one embodiment, the present systems and methods remedy the problems of current HVAC systems by incorporating real-time HVAC workload and cost logic as well as real-time temperature management to improve the efficient use of the HVAC system in a home or other type of building. Thus, one aspect of the invention relates to systems, methods and related devices for improving the efficiency of HVAC systems via monitoring and controlling one or more aspects of an environment of a premises. Present HVAC systems are typically controlled by a centrally located thermostat. The centrally located thermostat usually controls a single HVAC heating and cooling unit. A user may set the thermostat to turn on cooling when the thermostat registers a high temperature threshold, and set the thermostat to turn on heating when the thermostat registers a low temperature threshold. For example, a user may set the thermostat to trigger the furnace turning on when the thermostat registers 68 degrees Fahrenheit (° F.) or less. Likewise, a user may set the thermostat to trigger the air conditioning unit when the thermostat registers 72° F. or more. The problem with using only temperature to control a climate of an entire premises lies in the fact that temperatures vary widely for the cold-weather and warm-weather settings. The present system, however, may learn user preferences and, based on the learned user preferences, automatically adjust the temperature and humidity settings within a building without user input. Accordingly, the present systems and methods may be configured to monitor one or more factors of an environment of a premises in order to calculate, in real-time, a suggested temperature and/or humidity setting.

Figure 1:
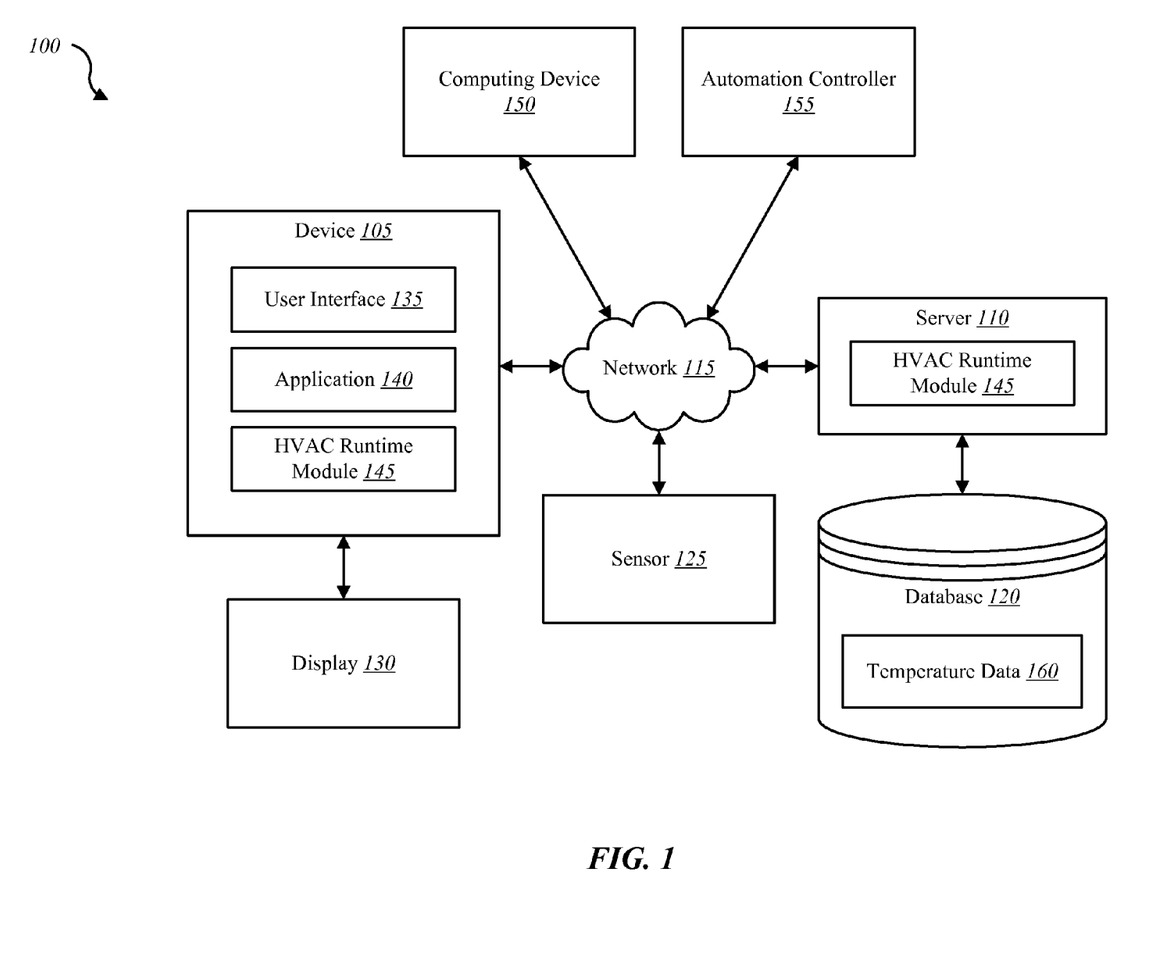
FIG. 1 is a block diagram illustrating one embodiment of an environment in which the present systems and methods may be implemented.

In one embodiment, the system and methods described herein detect a thermostat being set to a target indoor temperature. The system may detect a user manually setting the thermostat, detect the thermostat being set according to a scheduled program, and/or detect a thermostat being set remotely (e.g., via the Internet, an application on a smartphone, etc.). The system may detect the current indoor/outdoor conditions (e.g., temperature, humidity, etc.) and calculate an estimated runtime of an HVAC heating or cooling cycle relative to the target temperature. The estimated runtime may be based on a relation of the target temperature to the current indoor/outdoor conditions and to a result of querying a correlation database. The correlation database may store correlations between previous indoor/outdoor conditions during previous HVAC heating and cooling cycles that operated based on previous target temperatures. For example, on a previous day a target temperature may have been 72° F. The indoor conditions may have been an indoor temperature of 75° F. and an indoor humidity of 25%. The outdoor conditions may have been 78° F. and an outdoor humidity of 30%. An HVAC cooling cycle may have been initiated based on the temperature differential of 3° F. between the target temperature and the current indoor temperature. Data points for the HVAC cooling cycle may include the HVAC cooling cycle lasting 20 minutes and costing $1.33 (based on a 20-kilowatt energy rating for the HVAC system at 20 cents per kilowatt-hour, totally $4 per hour). Accordingly, the present systems and methods may store the data points for this HVAC cooling cycle in the correlation database, along with similar data points for other target temperatures and their relatives HVAC cooling/heating cycles and indoor/outdoor conditions, etc. Based on an analysis of current indoor/outdoor conditions and target temperature in relation to an HVAC cooling/heating cycle, the present systems and methods may calculate an estimated runtime and/or estimated cost for a given target temperature by comparing current indoor/outdoor conditions to the data points in the correlation database. The systems and methods may calculate a suggested target temperature based on this analysis. Cost and runtime information may be calculated for the current target temperature and/or the suggested target temperatures, which may be communicated via a generated notification FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a sensor 125, a display 130, a computing device 150, an automation controller 155, and a network 115 that allows the device 105, the server 110, the computing device 150, automation controller 155, and sensor 125 to communicate with one another.

Examples of the device 105 may include any combination of mobile devices, smart phones, personal computing devices, computers, laptops, desktops, servers, media content set top boxes, satellite set top boxes, cable set top boxes, DVRs, personal video recorders (PVRs), etc. In some cases, device 105 may include a building automation controller integrated within device 105, or as depicted, may be in communication with an automation controller via network 115. In some cases, device 105 may include a thermostat. Examples of the automation controller 155 may include any device configured to control a building such as a home, a business, a government facility, etc. Accordingly, examples of automation controller 155 include any combination of a dedicated building automation computing device (e.g., wall-mounted controller), a personal computing device (e.g., laptop, desktop, etc.), a mobile computing device (e.g., tablet computing device, smartphone, etc.), and the like. Examples of computing device 150 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, etc.

Examples of sensor 125 may include any combination of a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, other types of sensors, actuators, or combinations thereof. Sensor 125 may represent one or more separate sensors or a combination of two or more sensors in a single device. For example, sensor 125 may represent one or more camera sensors and one or more motion sensors connected to environment 100. Sensor 125 may be integrated with an identity detection system such as a facial recognition system and/or a voice recognition system. Although sensor 125 is depicted as connecting to device 105 over network 115, in some embodiments, sensor 125 may connect directly to or within device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be carried by an occupant. Sensor 125 may include a wireless communication sensor 125 configured to send and receive data and/or information to and from one or more devices in environment 100. Additionally, or alternatively, sensor 125 may include a GPS sensor to enable sensor 125 to track a location of sensor 125 attached to an occupant and/or object. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a user interface 135, application 140, and HVAC runtime module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, HVAC runtime module 145, automation controller 155, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet.

It is noted that in some embodiments, the device 105 may not include an HVAC runtime module 145. For example, device 105 may include application 140 that allows device 105 to interface with automation controller 155 via HVAC runtime module 145 located on another device such as computing device 150 and/or server 110. In some embodiments, device 105, automation controller 155, and server 110 may include an HVAC runtime module 145 where at least a portion of the functions of HVAC runtime module 145 are performed separately and/or concurrently on device 105, automation controller 155, and/or server 110. Likewise, in some embodiments, a user may access the functions of device 105 and/or automation controller 155 (directly or through device 105 via HVAC runtime module 145) from computing device 150. For example, in some embodiments, computing device 150 includes a mobile application that interfaces with one or more functions of device 105, automation controller 155, HVAC runtime module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include temperature data 160. For example, device 105 may access temperature data 160 in database 120 over network 115 via server 110. Temperature data 160 may include data regarding thermostat settings such as target temperature settings, monitored indoor and/or outdoor conditions, temperature differentials (e.g., difference between a target temperature and a current indoor temperature), HVAC cycle runtimes, and/or HVAC cycle costs.

In some embodiments, HVAC runtime module 145 may be configured to perform the systems and methods described herein in conjunction with user interface 135 and application 140. Further details regarding the HVAC runtime module 145 are discussed below. HVAC runtime module 145 may enable calculating workload and cost logic regarding an HVAC system based on HVAC cycle runtime. Accordingly, HVAC runtime module 145 may determine an HVAC cycle runtime and calculate HVAC costs and/or energy use based on the determined HVAC cycle runtime.

Figure 2:
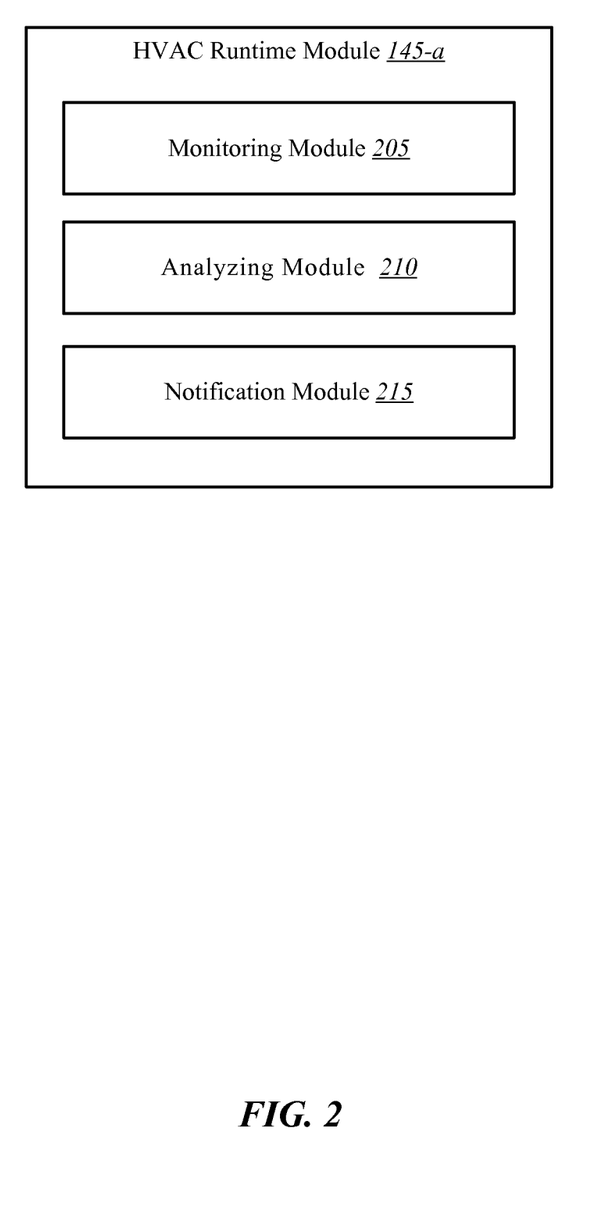
FIG. 2 is a block diagram illustrating one example of an HVAC runtime module.

FIG. 2 is a block diagram illustrating one example of an HVAC runtime module 145-*a*. HVAC runtime module 145-*a* may be one example of HVAC runtime module 145 depicted in FIG. 1. As depicted, HVAC runtime module 145-*a* may include monitoring module 205, analyzing module 210, and notification module 215.

In one embodiment, monitoring module 205 may detect a thermostat of an HVAC system being set to a target temperature. The target temperature may be set manually at the thermostat or remotely via a mobile computing device. In some cases, the target temperature may be set according to a scheduled program (e.g., the thermostat is set at 72° F. every day at 3:00 P.M.). Upon detecting the thermostat being set to the target temperature, monitoring module 205 may detect a current indoor condition and/or a current outdoor condition. The monitored current indoor condition may include a current indoor temperature and/or a current indoor humidity. The monitored current outdoor condition may include a current outdoor temperature and/or a current outdoor humidity.

In some embodiments, analyzing module 210 may calculate an estimated runtime of an HVAC heating or cooling cycle for a given target temperature. For example, if a thermostat is set to 72° F. and the indoor temperature is detected to be 74° F., analyzing module 210 may estimate how long the HVAC cooling cycle will take to cool the indoor temperature to the target temperature of 72° F. The estimated runtime may be calculated based on the target temperature, the current indoor and outdoor conditions, and/or on a result of querying a correlation database. The correlation database may include data points for several previous HVAC heating and cooling cycles. Thus, analyzing module 210 may use data from previous HVAC heating and cooling cycles to estimate a current runtime.

In some embodiments, analyzing module 210 may calculate a cost of the estimated runtime by querying an energy rate database. The cost of the estimated runtime may be based on an identified energy rating of the HVAC system such as an energy rating of 10 kW or 20 kW. The data points of each of the plurality of previous HVAC heating and cooling cycles may include a correlation between an indoor condition, outdoor condition, a calculated indoor temperature difference, a cycle runtime, and/or cost associated with at least one of the plurality of previous HVAC heating and cooling cycles. The indoor temperature difference may indicate a difference between an indoor temperature and a target temperature at the time one of the plurality of previous HVAC heating and cooling cycles is initiated. Additionally, or alternatively, the data points may include a calculated outdoor temperature difference. The outdoor temperature difference may indicate a difference between an outdoor temperature and a target temperature at the time one of the plurality of previous HVAC heating and cooling cycles is initiated.

In one embodiment, analyzing module 210 may calculate a suggested temperature setting based on the calculation of the estimated runtime. The suggested temperature setting may include one or more suggested target temperatures. In some cases, analyzing module 210 may calculate a cost for each of the one or more suggested target temperatures in the suggested temperature setting. For example, the target temperature of a thermostat may be set to 72 F. The analyzing module 210 may calculate a first suggested target temperature of 73 F. and a second suggested target temperature of 74 F. For each suggested target temperature, analyzing module 210 may calculate an associated cost and/or cost savings.

In some embodiments, notification module 215 may generate a notification in association with a suggested target temperature calculated by analyzing module 210. The notification may be shown on a display (e.g., display 130 of FIG. 1). The notification may include one or more of an elapsed runtime of a current HVAC cycle, a cost accumulated so far in the current HVAC cycle, an estimated remaining cost associated with the current HVAC cycle, an estimated total cost if no changes are made with the current HVAC cycle, one or more suggested target temperatures, and/or the cost of the one or more suggested target temperatures.

In one embodiment, analyzing module 210 may identify a closest match between the current indoor and outdoor conditions and an entry in the correlation database. For example, analyzing module 210 may compare the current indoor temperature and find one or more entries in the correlation database with recorded indoor temperature matching closest to the current indoor temperature. Analyzing module 210 may then compare the current indoor humidity among these matching entries to find those entries with the closest matching indoor humidity. Analyzing module 210 may then compare outdoor conditions to the presently found matching entries to further refine the search until one or more closet matching entries are identified. In one embodiment, analyzing module 210 may compare a recorded HVAC cycle runtime in the one or more closest matching entries with a current HVAC cycle runtime. Upon determining the current HVAC cycle runtime exceeds the measured runtime, notification module 215 may generate a notification indicating a potential fault may exist in the HVAC system. In some cases, analyzing module 210 may suggest a modification to the target temperature if an accumulated runtime of a current cycle satisfies a runtime threshold. Additionally, or alternatively, analyzing module 210 may suggest a modification to the target temperature if an accumulated cost of a current cycle satisfies a cost threshold, an estimated remaining runtime to get to the target temperature satisfies an estimated runtime threshold, and/or an estimated remaining cost to get to the target temperature satisfies an estimated cost threshold.

Upon determining the data points of the correlation database satisfy a predetermined threshold, analyzing module 210 may enable the HVAC analysis described herein. Thus, in some embodiments, upon determining the data points of the correlation database satisfy a predetermined threshold, analyzing module 210 may enable detecting thermostat settings, detecting indoor/outdoor conditions, and analyzing the thermostat settings, indoor/outdoor conditions, and previous HVAC heating and cooling cycles in order to estimate a runtime of a current HVAC heating or cooling cycle for a given target temperature.

Figure 3:
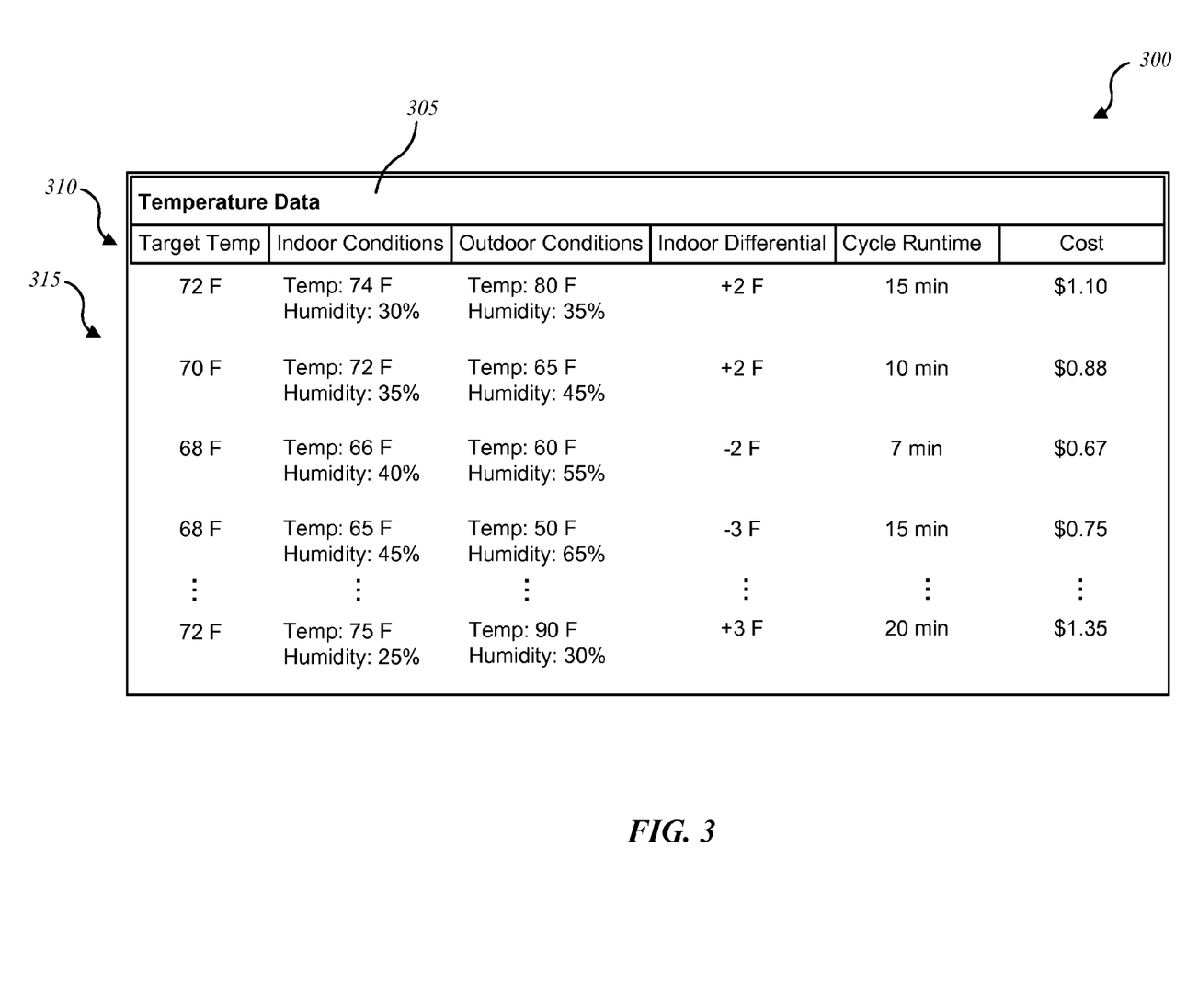
FIG. 3 is a block diagram illustrating one example of database entries for HVAC workload and cost logic.

FIG. 3 is a block diagram illustrating one example of database entries 300 for HVAC workload and cost logic. As depicted, the database entries 300 may include a title section 305, a subtitle section 310, and a data section 315. For example, as illustrated, the database entries 300 may include a title section 305 of "Temperature Data," indicating that the stored data relates to gathered temperature-related data (e.g., monitored indoor/outdoor conditions, etc.). In some embodiments, the entries 300 may be one example of the temperature data 160 of FIG. 1. The entries 300 may include subtitles such as "Target Temp," "Indoor Conditions," "Outdoor Conditions," "Indoor Differential," "Cycle Runtime," and "Cost," indicating the type of data stored in each entry. The data section 315 may include the recorded data values. Thus, the data section 315 may include one or more recorded target temperatures under the "Target Temp" subtitle, for example. The data under "Target Temp" may indicate target temperatures of a premises recorded at various times. For example, when a user adjusts the target temperature of a thermostat, this adjustment may trigger HVAC runtime module 145 to record the new target temperature as an entry. In some embodiments, the most recently recorded entry may indicate current conditions of a premises. In some embodiments, the most recent entry may be the top-most entry. Thus, the current conditions of the premises may be 74° F. indoors with 30% humidity, 80° F. outdoors with 35% humidity, and the current target temperature is 72° F. As illustrated, an entry may include an indoor differential. The indoor differential may indicate the difference between the target temperature at a given time and the indoor temperature at that time. In some cases, an entry may include an outdoor differential, the outdoor differential indicating the difference between the target temperature at a given time and the outdoor temperature at that time. Accordingly, the top entry indicates that the thermostat of the premises is set at 72° F. while the indoor temperature is 74° F. With the indoor temperature 2° F. higher than the target temperature, the indoor differential would be +2° F., as illustrated, and with the outdoor temperature 8° F. higher than the target temperature, the outdoor differential would be +8° F. In addition, each entry may include a cycle runtime indicating the time of an HVAC heating or cooling cycle. Thus, the top entry indicates the current cycle runtime is 15 minutes. This value may indicate the time of a completed HVAC cycle and/or the time of an on-going current HVAC cycle. Also depicted, each entry may include a cost associated with an HVAC cycle. Thus, the top-most entry indicates that the 15-minute HVAC cycle has an associated cost of $1.10.

In some cases, HVAC runtime module 145 may calculate a suggested target temperature based on an analysis of the entries 300. One or more thresholds may be configured based on HVAC cycle runtimes, associated costs, and/or calculated indoor and/or outdoor differentials recorded in entries 300. In some embodiments, HVAC runtime module 145 may calculate a suggested target temperature based on the current indoor/outdoor conditions and based on the data recorded in entries 300. As one example, a current HVAC cycle may indicate a runtime of 30 minutes for a target temperature of 72° F., starting indoor temperature of 75° F., and indoor humidity of 25%. HVAC runtime module 145 may compare these conditions to the data in entries 300. HVAC runtime module 145 may identify the bottom entry depicted in FIG. 3 as being the closest recorded match to these current conditions. HVAC runtime module 145 may treat the associated runtime of 20 minutes in this bottommost entry as a threshold with which to analyze the current conditions. Upon determining the 30 minute runtime of the current cycle satisfies a predetermined runtime threshold (e.g., the runtime threshold is satisfied when a current runtime exceeds a closest matching runtime by more than 10%), HVAC runtime module 145 may generate a notification indicating a potential fault in the HVAC system. Additionally, or alternatively, HVAC runtime module 145 may calculate a new suggested target temperature. Thus, upon detecting the current runtime exceeding the closest matching runtime by 50%, HVAC runtime module 145 may generate a notification that indicates a potential fault in the HVAC system and/or a new suggested target temperature. Accordingly, HVAC runtime module 145 may query entries 300 for previously recorded data in order to analyze current indoor/outdoor conditions in relation to a target temperature setting and calculate a suggested target temperature to save costs and still provide a level of comfort.

Figure 4:
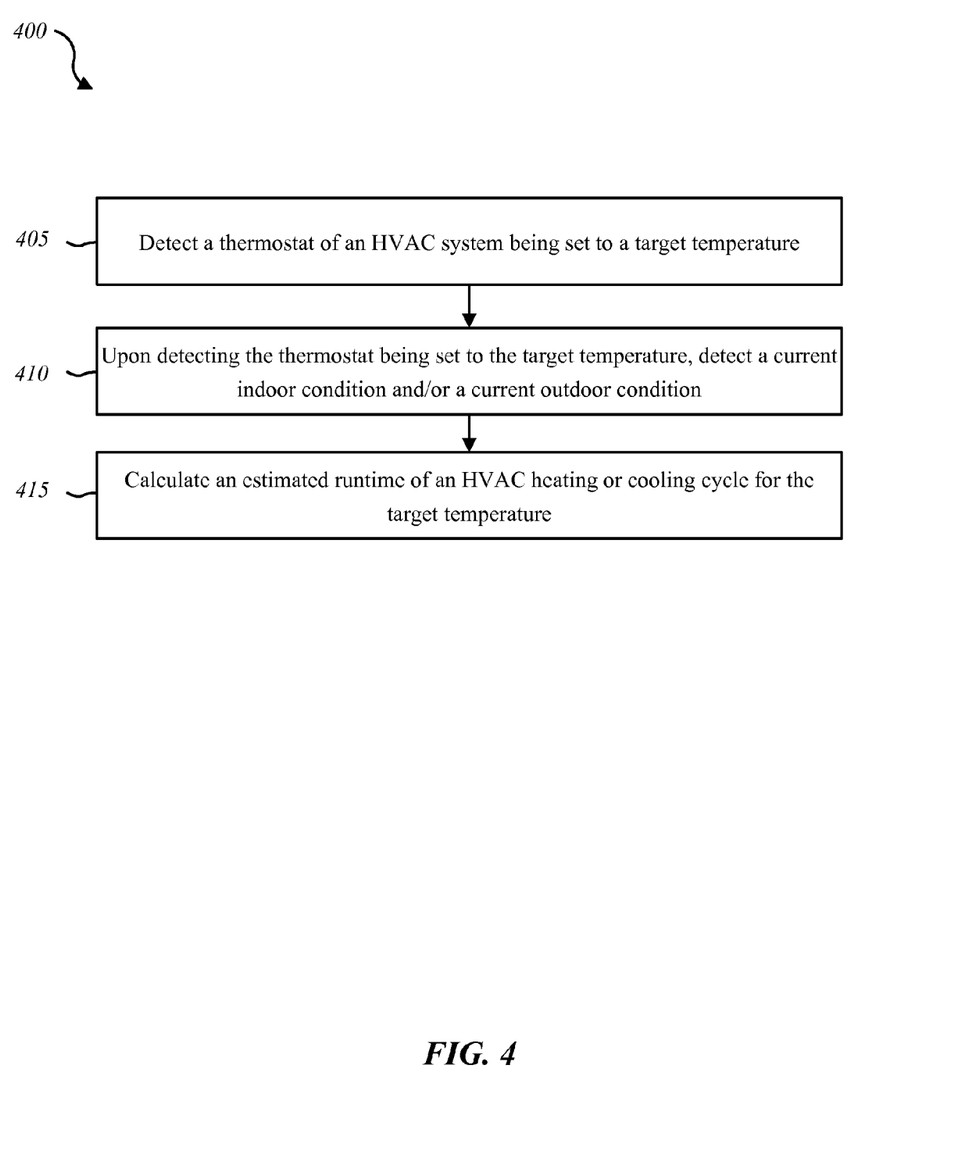
FIG. 4 is a flow diagram illustrating one embodiment of a method for HVAC workload and cost logic.

FIG. 4 is a flow diagram illustrating one embodiment of a method 400 for HVAC workload and cost logic. In some configurations, the method 400 may be implemented by the HVAC runtime module 145 illustrated in FIGS. 1 and/or 2. In some configurations, the method 400 may be implemented in conjunction with the application 140 and/or the user interface 135 illustrated in FIG. 1.

At block 405, a thermostat of an HVAC system may be detected being set to a target temperature. At block 410, upon detecting the thermostat being set to the target temperature, a current indoor condition and/or a current outdoor condition may be detected. At block 415, an estimated runtime of an HVAC heating or cooling cycle for the target temperature may be calculated. The estimated runtime may be based on the target temperature, the current indoor and outdoor conditions, and/or on a result of querying a correlation database. The correlation database may include data points for a plurality of previous HVAC heating and cooling cycles.

Figure 5:
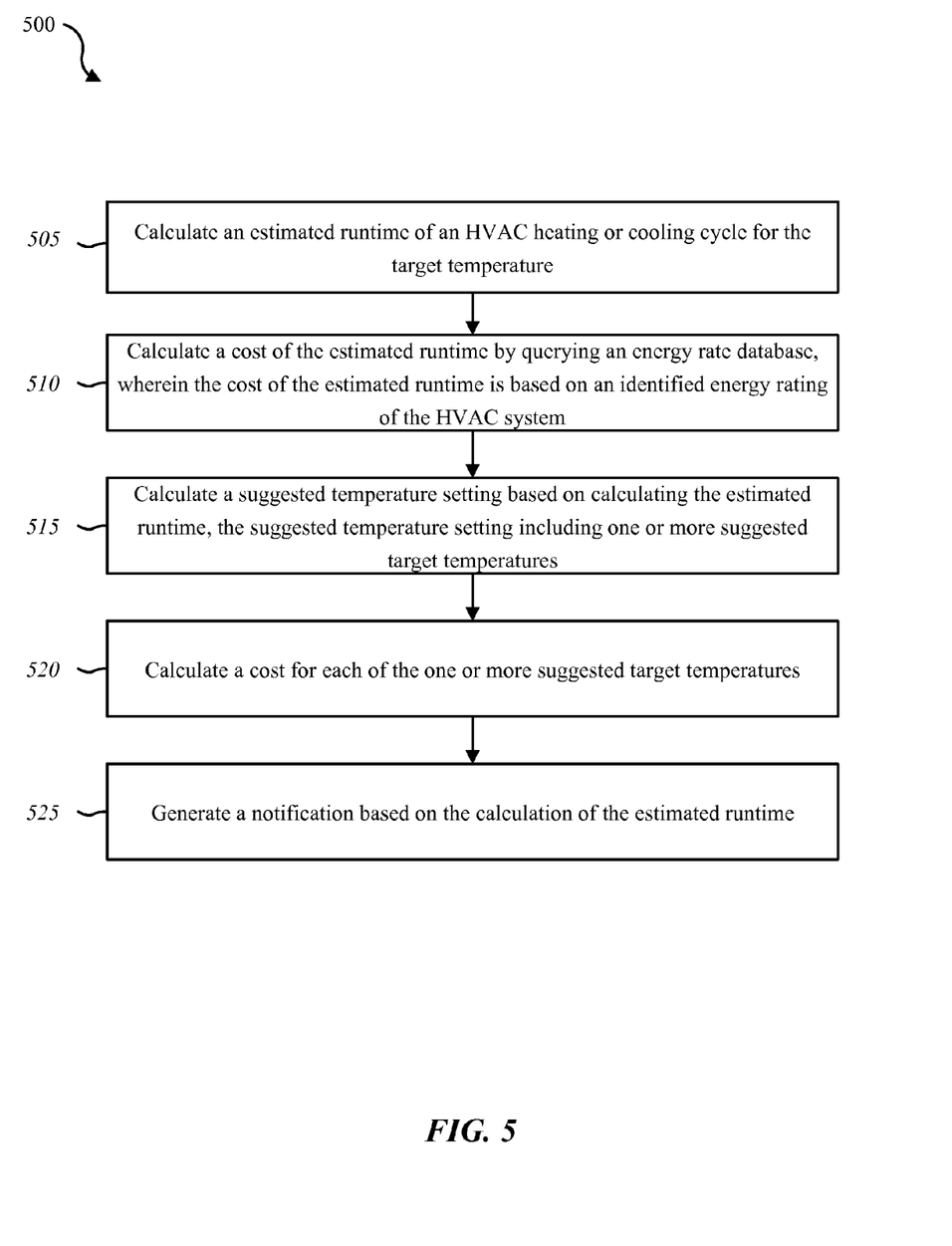
FIG. 5 is a flow diagram illustrating one embodiment of a method for HVAC workload and cost logic.

FIG. 5 is a flow diagram illustrating one embodiment of a method 500 for HVAC workload and cost logic. In some configurations, the method 500 may be implemented by the HVAC runtime module 145 illustrated in FIG. 1 or 2. In some configurations, the method 500 may be implemented in conjunction with the application 140 and/or the user interface 135 illustrated in FIG. 1.

At block 505, an estimated runtime of an HVAC heating or cooling cycle for the target temperature may be calculated. The estimated runtime may be based on a target temperature, current indoor and outdoor conditions, and/or on a result of querying a correlation database. The correlation database may include data points for a plurality of previous HVAC heating and cooling cycles. At block 510, a cost of the estimated runtime may be calculated by querying an energy rate database. The cost of the estimated runtime may be based on an identified energy rating of the HVAC system. At block 515, a suggested temperature setting may be calculated based on calculating the estimated runtime. The suggested temperature setting may include one or more suggested target temperatures. At block 520, a cost for each of the one or more suggested target temperatures may be calculated. At block 525, a notification may be generated based on the calculation of the estimated runtime the notification comprising one or more of an elapsed runtime of a current HVAC cycle, a cost accumulated so far in the current HVAC cycle, an estimated remaining cost associated with the current HVAC cycle, an estimated total cost if no changes are made with the current HVAC cycle, one or more suggested target temperatures, and the cost of the one or more suggested target temperatures.

Figure 6:
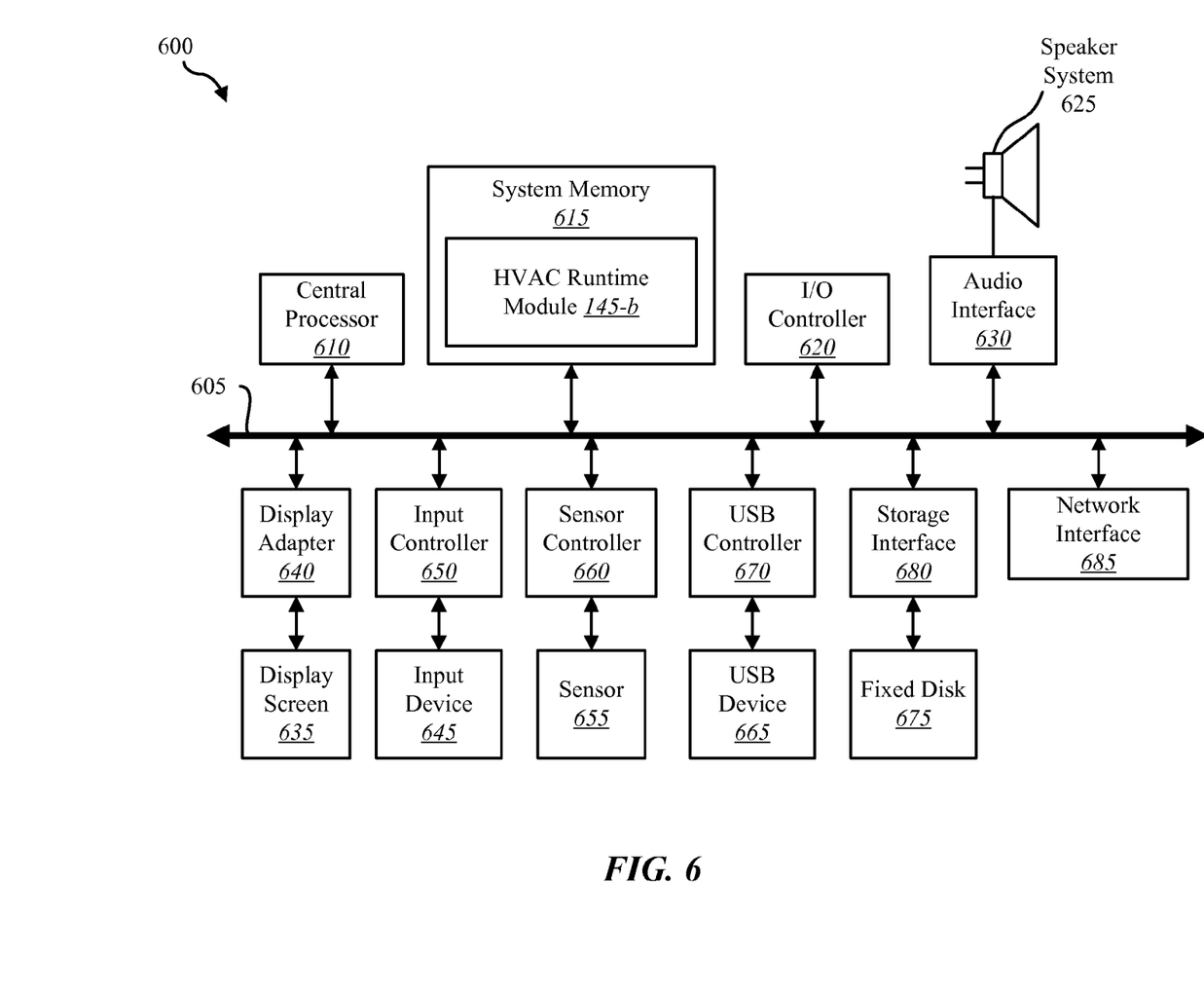
FIG. 6 depicts a block diagram of a computer system suitable for implementing the present systems and methods.

FIG. 6 depicts a block diagram of a computing device 600 (also referred to as a controller) suitable for implementing the present systems and methods. The computing device 600 may be an example of device 105, computing device 150, automation controller 155 and/or server 110 illustrated in FIG. 1. In one configuration, computing device 600 includes a bus 605 which interconnects major subsystems of computing device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the HVAC runtime module 145-b to implement the present systems and methods may be stored within the system memory 615. Applications (e.g., application 140) resident with computing device 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via network interface 685.

Storage interface 680, as with the other storage interfaces of computing device 600, can connect to a standard computer readable medium for storage and/or retrieval of information, such as a fixed disk drive 675. Fixed disk drive 675 may be a part of computing device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computing device 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk drive 675. The operating system provided on computing device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for heating ventilation air conditioning (HVAC) analysis, comprising:
    detecting, via a processor of an HVAC system, a thermostat of the HVAC system being set to a target temperature;
    upon detecting the thermostat being set to the target temperature, detecting, via the processor of the HVAC system, a current indoor condition and a current outdoor condition based at least in part on received sensor data from a sensor;
    calculating, via the processor of the HVAC system, an estimated runtime of an HVAC heating or cooling cycle for the target temperature, the estimated runtime being based on the target temperature, the current indoor and outdoor conditions, and on a result of querying a correlation database, the correlation database comprising data points for a plurality of previous HVAC heating and cooling cycles; and
    upon determining the data points of the correlation database satisfy a predetermined threshold, enabling, via the processor of the HVAC system, the HVAC analysis.

2. The method of claim 1, comprising:
    calculating a cost of the estimated runtime by querying an energy rate database, wherein the cost of the estimated runtime is based on an identified energy rating of the HVAC system.

3. The method of claim 1, wherein the current indoor condition comprises at least one of a current indoor temperature and a current indoor humidity.

4. The method of claim 1, wherein the current outdoor condition comprises at least one of a current outdoor temperature and a current outdoor humidity.

5. The method of claim 1, the data points of each of the plurality of previous HVAC heating and cooling cycles comprising a correlation between:
    at least one indoor condition relative to one of the plurality of previous HVAC heating and cooling cycles;
    at least one outdoor condition relative to one of the plurality of previous HVAC heating and cooling cycles; and
    a calculated indoor temperature difference, the indoor temperature difference comprising a difference between an indoor temperature and a target temperature at the time one of the plurality of previous HVAC heating and cooling cycles is initiated.

6. The method of claim 1, comprising:
    calculating a suggested temperature setting based on calculating the estimated runtime, the suggested temperature setting including one or more suggested target temperatures; and
    calculating a cost for each of the one or more suggested target temperatures.

7. The method of claim 1, comprising:
    generating a notification, the notification comprising one or more of an elapsed runtime of a current HVAC cycle, a cost accumulated so far in the current HVAC cycle, an estimated remaining cost associated with the current HVAC cycle, an estimated total cost if no changes are made with the current HVAC cycle, one or more suggested target temperatures, and the cost of the one or more suggested target temperatures.

8. The method of claim 1, comprising:
    identifying a closest match between the current indoor and outdoor conditions and an entry in the correlation database;
    comparing a recorded runtime in the closest matching entry in the correlation database with a current runtime; and
    upon determining the current runtime exceeds the recorded runtime, generating a notification indicating a potential fault in the HVAC system.

9. The method of claim 1, comprising:
    suggesting a modification to the target temperature if:
        an accumulated runtime of a current cycle satisfies a runtime threshold;
        an accumulated cost of the current cycle satisfies a cost threshold;
        an estimated remaining runtime to get to the target temperature satisfies an estimated runtime threshold; or
        an estimated remaining cost to get to the target temperature satisfies an estimated cost threshold.

10. A computing device configured for heating ventilation air conditioning (HVAC) analysis, comprising:
    a processor; and
    memory in electronic communication with the processor, wherein the memory stores computer executable instructions that when executed by the processor cause the processor to perform the steps of:
        detecting a thermostat of an HVAC system being set to a target temperature;
        upon detecting the thermostat being set to the target temperature, detecting a current indoor condition and a current outdoor condition;
        calculating an estimated runtime of an HVAC heating or cooling cycle for the target temperature, the estimated runtime being based on the target temperature, the current indoor and outdoor conditions, and on a result of querying a correlation database, the correlation database comprising data points for a plurality of previous HVAC heating and cooling cycles; and upon determining the data points of the correlation database satisfy a predetermined threshold, enabling the HVAC analysis.

11. The computing device of claim 10 wherein the instructions executed by the processor cause the processor to perform the steps of:
calculating a cost of the estimated runtime by querying an energy rate database, wherein the cost of the estimated runtime is based on an identified energy rating of the HVAC system.

12. The computing device of claim 10, wherein the current indoor condition comprises at least one of a current indoor temperature and a current indoor humidity.

13. The computing device of claim 10, wherein the current outdoor condition comprises at least one of a current outdoor temperature and a current outdoor humidity.

14. The computing device of claim 10, the data points of each of the plurality of previous HVAC heating and cooling cycles comprising a correlation between:
at least one indoor condition relative to one of the plurality of previous HVAC heating and cooling cycles;
at least one outdoor condition relative to one of the plurality of previous HVAC heating and cooling cycles;
at least one runtime relative to one of the plurality of previous HVAC heating and cooling cycles; and
a calculated indoor temperature difference, the indoor temperature difference comprising a difference between an indoor temperature and a target temperature at the time one of the plurality of previous HVAC heating and cooling cycles is initiated.

15. The computing device of claim 10, wherein the instructions executed by the processor cause the processor to perform the steps of:
calculating a suggested temperature setting based on calculating the estimated runtime, the suggested temperature setting including one or more suggested target temperatures; and
calculating a cost for each of the one or more suggested target temperatures.

16. The computing device of claim 10, wherein the instructions executed by the processor cause the processor to perform the steps of:
generating a notification, the notification comprising one or more of an elapsed runtime of a current HVAC cycle, a cost accumulated so far in the current HVAC cycle, an estimated remaining cost associated with the current HVAC cycle, an estimated total cost if no changes are made with the current HVAC cycle, one or more suggested target temperatures, and the cost of the one or more suggested target temperatures.

17. The computing device of claim 10, wherein the instructions executed by the processor cause the processor to perform the steps of:
identifying a closest match between the current indoor and outdoor conditions and an entry in the correlation database;
comparing a recorded runtime in the closest matching entry in the correlation database with a current runtime; and
upon determining the current runtime exceeds the recorded runtime, generating a notification indicating a potential fault in the HVAC system.

18. The computing device of claim 10, wherein the instructions executed by the processor cause the processor to perform the steps of:
suggesting a modification to the target temperature if:
an accumulated runtime of a current cycle satisfies a runtime threshold;
an accumulated cost of the current cycle satisfies a cost threshold;
an estimated remaining runtime to get to the target temperature satisfies an estimated runtime threshold; or
an estimated remaining cost to get to the target temperature satisfies an estimated cost threshold.

19. A non-transitory computer-readable storage medium storing computer executable instructions that when executed by a processor cause the processor to perform the steps of:
detecting a thermostat of an HVAC system being set to a target temperature;
upon detecting the thermostat being set to the target temperature, detecting a current indoor condition and a current outdoor condition;
calculating an estimated runtime of an HVAC heating or cooling cycle for the target temperature, the estimated runtime being based on the target temperature, the current indoor and outdoor conditions, and on a result of querying a correlation database, the correlation database comprising data points for a plurality of previous HVAC heating and cooling cycles; and
upon determining the data points of the correlation database satisfy a predetermined threshold, enabling the HVAC analysis.

* * * * *